Jan. 5, 1960   V. J. ARBLASTER   2,919,958
COMBINED JOURNAL STOP AND BACK SEAL FOR JOURNAL BEARINGS
Filed June 7, 1957   4 Sheets-Sheet 1

INVENTOR
V. J. ARBLASTER

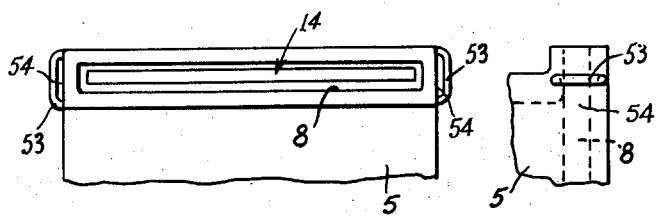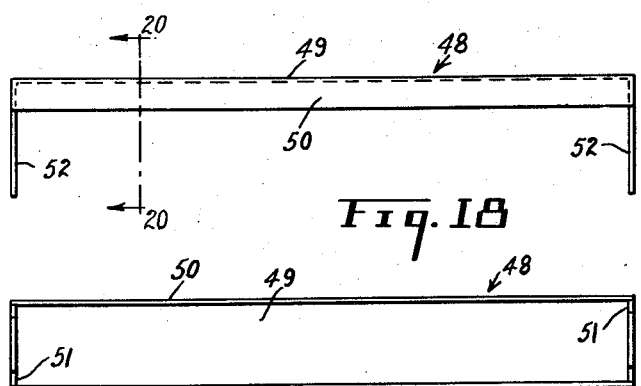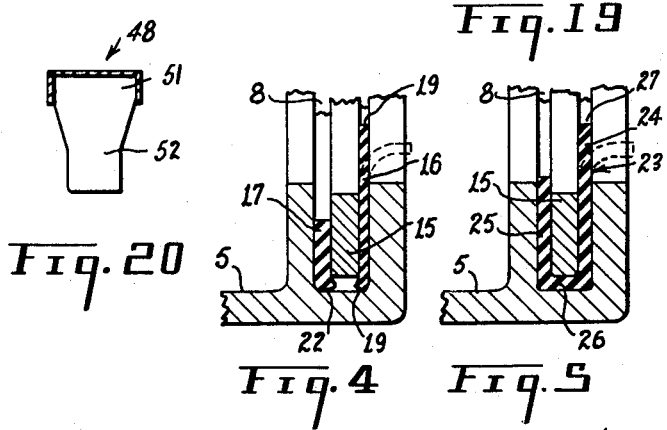

Jan. 5, 1960 V. J. ARBLASTER 2,919,958
COMBINED JOURNAL STOP AND BACK SEAL FOR JOURNAL BEARINGS
Filed June 7, 1957 4 Sheets-Sheet 3

INVENTOR
V. J. ARBLASTER
By Fetherstonhaugh & Co.
Attorneys

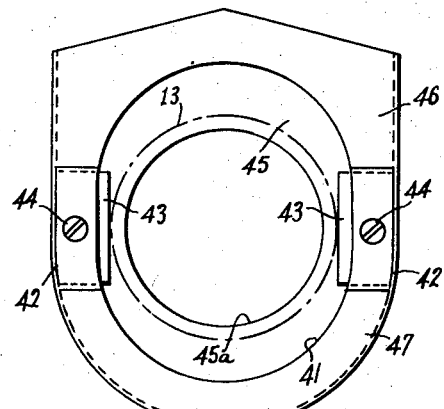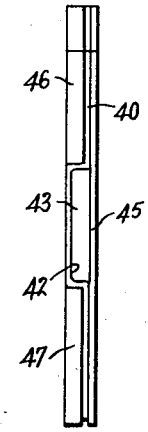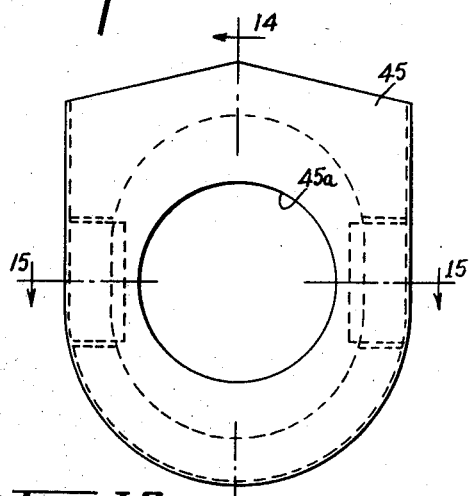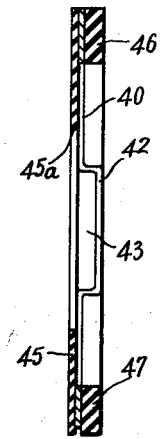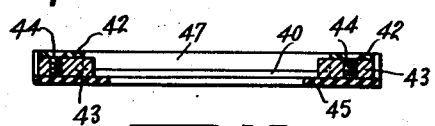

United States Patent Office 2,919,958
Patented Jan. 5, 1960

2,919,958

COMBINED JOURNAL STOP AND BACK SEAL FOR JOURNAL BEARINGS

Victor Jones Arblaster, Montreal, Quebec, Canada, assignor to Canadian Bronze Company, Limited, Montreal, Quebec, Canada Application June 7, 1957, Serial No. 664,407

14 Claims. (Cl. 308—80)

This invention relates to journal boxes for railway cars and the like and it consists in the provision of a journal box attachment which serves both as a journal stop and as a back seal for sealing the journal box against the ingress of dirt and dust and the egress of lubricant.

In the present instance the invention is described as applied to a journal box equipped with a journal bearing of the solid type. However, it will be understood that this is merely illustrative and that the attachment provided in accordance with this invention is also useful in connection with journal boxes equipped with sleeve, roller or other types of journal bearings.

The particular embodiment of the invention described herein consists essentially in the provision of a journal stop plate combined with a rubber seal member, both of which are a tight fit in the dust guard well of a car journal box, the stop plate limiting the longitudinal movement of the journal lengthwise of the train in a front to rear direction while the rubber seal cushions the movement of the stop plate in the dust guard well at the same time forming a tight but elastic seal about the dust guard seat of the wheel axle in any position taken by the axle relative to the journal box.

There have been many attempts to limit the movement of the journal relative to the journal box and to provide an effective seal which will prevent the entry of dust and moisture into the journal box particularly through its back wall while at the same time preventing the exit of oil from the journal box. So far as journal stops are concerned some have been effective in limiting the movement of the journal but in doing so have taken up considerable space within the journal box. Such journal stops have to some extent made it harder for maintenance crews to check and change the journal bearing and wedge thereby adding to the idle time of the cars. Back seals have been used which are of a solid nature such as wood and moulded rubber or fibre all of which were sealed by means of pliable material cemented into the dust guard well over the back seal. In addition, such seals had a serious drawback in that their bore was made with a clearance over the standard diameter over the dust guard seat of the journal, relying on a roll of waste packing commonly called "dope" and the pliable material to seal such clearance. Such seals had to be replaced whenever the wheel axle was machined down to overcome journal wear in service.

The use of a combined journal stop and back seal fitted within the dust guard well of a journal box leaves the bearing compartment completely free of any mechanism which might tend to strain or damage the axle, bearing and box and allows ample room for the introduction of pack type lubricators into the journal box while at the same time giving full protection against leakage of oil through the back of the journal box even against the pumping action associated with pack type lubricators. The combined journal stop and back seal allows for ample clearance for normal relative movement of the journal and journal box while cushioning the shock between the journal stop and the walls of the dust guard well.

The object of the invention therefore is to provide a simple and efficient journal stop and back seal which can be fitted into existing dust guard wells and provide a tight but flexible seal about the dust guard seat of the journal.

A further object of the invention is to provide a journal stop and back seal which will eliminate the use of a pliable cementitious material as a filler and sealing medium for the dust guard well of a journal box.

A further object of the invention is to provide a journal stop and back seal which will accommodate itself to variations from standard of car journals and to relative displacement of the journal and journal box.

A further object of the invention is to provide a journal stop and back seal which will restrict abnormal movement of the journal inside the journal box during brake application, switching, humping, etc. and to prevent damage to the dust guard well and component parts of the journal box assembly.

A further object of the invention is to provide a combined metal journal stop and rubber back seal in which the metal stop protects the rubber seal from injury while the rubber back seal cushions the metal stop on relative movement of the journal and journal box.

A further object of the invention is to provide a combined metal journal stop and rubber back seal in which the metal stop for the journal is non-corrosive and non-sparking.

A further object of the invention is to provide a cover for the open top of the dust guard well to protect the exposed edges of the back seal from dirt and moisture, also to prevent the entry of moisture and dirt into the journal box.

These and other objects of the invention will be apparent from the following specification and the accompanying drawings in which:

Fig. 4 is an enlarged vertical section of the bottom end of the dust guard well showing the back seal sealing against the side and bottom walls of the dust guard well.

Fig. 5 is a view similar to Fig. 4 but showing the back seal as an envelope around the outer edge of the journal stop plate.

Fig. 11 is a front vertical elevation of an alternative form of journal stop and back seal.

Fig. 12 is a back vertical elevation of the journal stop and back seal shown in Fig. 11.

Fig. 13 is a vertical side elevation of the journal stop and back seal shown in Fig. 11.

Fig. 14 is a vertical sectional view on the line 14—14 of Fig. 12.

Fig. 15 is a horizontal sectional view on the line 15—15 of Fig. 12.

Fig. 16 is a partial plan view of the top of a journal box showing the cover holding brackets welded to the sides of the box.

Fig. 17 is a partial side elevation of a journal box showing the cover holding brackets.

Fig. 18 is a vertical elevation of the dust cover for the top of the dust guard well.

Fig. 19 is a bottom plan view of the dust cover shown in Fig. 13.

Fig. 20 is a vertical section of the cover on the line 20—20 of Fig. 18.

Figure 1:
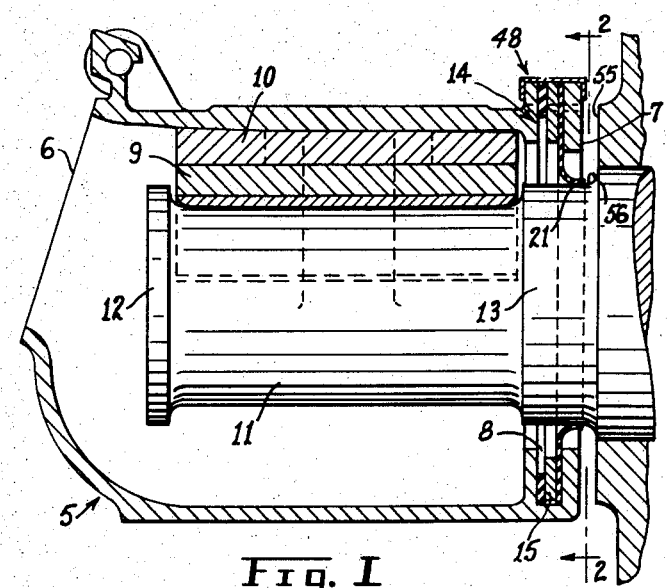
Fig. 1 is a vertical sectional elevation of a journal box showing the journal stop and back seal fitted in place in the dust guard well.

Referring to the drawings, a typical railroad journal box 5 is here shown provided with a front opening 6 and a back wall 7 forming a dust guard well 8. The journal box 5 has provision for the solid bearing 9 and wedge 10, the bearing 9 being supported on the journal 11. The journal 11 has a collar 12 limiting the relative movement of the journal 11 in the bearing 9 in one direction and a dust guard seat 13 limiting relative movement in the other direction.

The only condition to be met in accommodating the present invention to a typical journal box is that the dust guard well 8 be reasonably free of high and rough spots which might damage the rubber back seal.

The combined journal stop and back seal 14 shown in Fig. 1 comprises a metal plate 15 preferably of bronze but which could be of any other non-corrosive and non-sparking metal, and a rubber seal 16 on the outer or rear side of the plate 15 and a rubber seal 17 on the inner side of the plate 15. Both rubber seals 16 and 17 are bonded to the plate with suitable bonding material. The metal plate 15 forming the journal stop is of the same contour as the dust guard well 8 but is slightly smaller in size across its width and around its bottom edge. The journal stop 15 is provided with an oval shaped bore 18 whose major axis is disposed vertically and whose minor axis is disposed horizontally. The dimension of the minor axis of the bore 18 allows slight clearance only over the diameter of the dust guard seat portion 13 of the wheel journal 11 while the dimension of the major or vertical axis of the bore 18 allows for the normal vertical displacement of the dust guard seat 13 of the journal 11 relative to the journal box 5.

The rubber seal 16 is in the form of a sheet cut slightly larger at 19 beyond the side and bottom edges of the journal stop 15 and has a central bore 20 whose diameter is less than the diameter of the dust guard seat 13 but, being of rubber, will stretch when the journal box 5 is fitted over the journal 11 and can be pushed outwards into the position shown in Fig. 1 where it forms a tight but flexible bell-shaped seal 21 about the dust guard seat 13. The rubber seal 17 is in the form of a strip bonded on the inner face of the journal stop 15 and having its outer edge slightly larger at 22 beyond the sides and bottom edges of the journal stop. The combined thickness of the journal stop 15 and rubber seals 16 and 17 is such that when they are bonded together they will be a close fit in the dust guard well 8 with the rubber having sufficient resiliency to give over any rough spots and to seal against the walls of the dust guard well 8 sufficiently to exclude the entry of dust and moisture into the journal box 5 and to prevent the passage outwards of oil from the journal box. When the combined journal stop and back seal is pressed down into the dust guard well 8 the edges of the rubber which project over the edge plate 15 at 19 and 22 will be slightly crushed as shown in Fig. 4 to give a positive seal around the edges of the plate 15.

Figure 6:
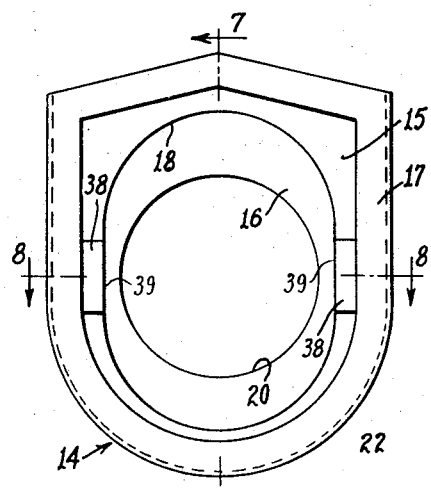
Fig. 6 is a front elevation of the assembled journal stop and back seal shown in Fig. 1.
Figure 7:
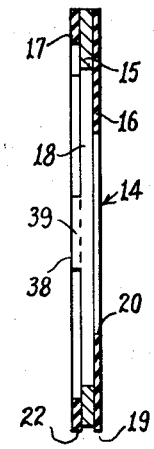
Fig. 7 is a vertical section on the line 7—7 of Fig. 6.

The rubber seals 16 and 17 may be combined into one unit in the form of an envelope 23 having a back wall 24, a front wall 25 and side and bottom edge walls 26. The back wall 24 has an aperture 27 similar in every respect to the aperture 20 shown in Figs. 6 and 7 and for the same purpose. The envelope 23 will have the exact appearance shown in Fig. 6 and the plate 15 can be fitted into the envelope 23 from the top, the envelope being first coated on its inner walls with a bonding material or, if desired, the surfaces of the plate 15 can be coated with the bonding material.

Figures 2, 3:
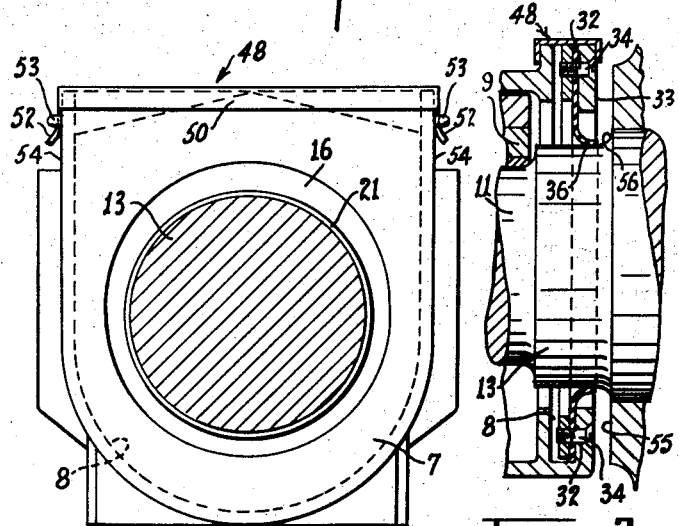
Fig. 2 is a vertical section on the line 2—2 of Fig. 1 looking on the inner end of the journal box and showing the rubber seal about the dust guard seat of the wheel axle.
Fig. 3 is a partial vertical section taken from Fig. 1 but showing a modified form of back seal.
Figure 9:
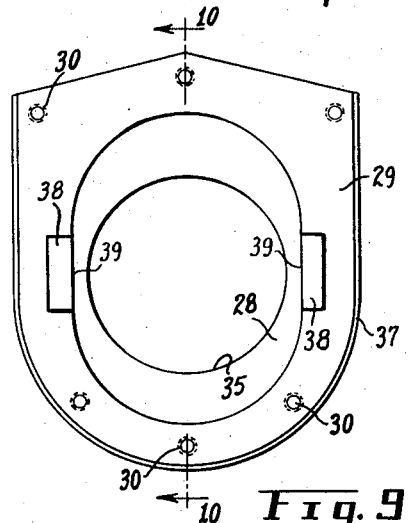
Fig. 9 is a front elevation of the assembled journal stop and end seal shown in Fig. 3.
Figure 10:
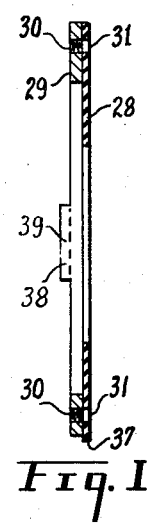
Fig. 10 is a vertical section on the line 10—10 of Fig. 9.
Figure 8:
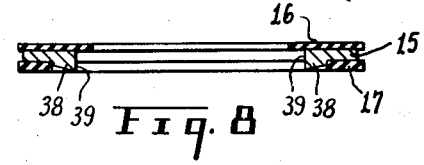
Fig. 8 is a horizontal section on the line 8—8 of Fig. 6.

An alternative design of combined journal stop and back seal is shown in Figs. 3, 9 and 10. In this design the back seal 28 only is used and is bonded to the journal stop 29. A series of holes 30 are drilled and tapped in the journal stop 29 with matching holes 31 punched in the rubber seal 28. Corresponding countersunk holes 32 are drilled in the rear wall 33 to take the screw 34 which is threaded into the tapped holes 30 in the journal stop 29 in order to pull the stop 29 and seal 28 tight against the back wall 33. The seal 28 is provided with an aperture 35 similar to the aperture 20 in Fig. 6 to form the seal 36 about the dust guard seat 13. The seal 28 is also slightly larger than the journal stop 29 at side and bottom edges as at 37.

The journal stop 15 in the form described above is generally cast of a non-corrosive and non-sparking metal and is provided with extra thickness pads 38 disposed vertically on the outer face on the normal horizontal centre line of the journal assembly. Such pads 38 provide the necessary extra thickness of metal wear surfaces 39 at the points of greatest longitudinal pressure between the dust guard seat 13 and the journal stop 15. The added linear contact between the dust guard seat 13 of the journal and the wear surfaces 39 of the pads 38 also helps to limit the angular displacement longitudinally of the journal with respect to the journal box thereby insuring longer wear life to the component parts of the journal assembly.

The above described cast journal stop 15 can be replaced by an alternative form shown in Figs. 11, 12, 13, 14 and 15. This alternative form consists of a sheet metal plate 40 of the same general shape as the journal stop 15. The sheet metal plate 40 is provided with an oval shaped aperture 41 whose major and minor axes are larger than that of the journal stop 15 in order to keep the metal well clear of the dust guard seat 13 of the journal 11 when the journal is in its extreme displaced positions. The sheet metal plate is stamped or otherwise formed with a horizontally disposed channel section 42 within which are seated the stop pads 43. These pads 43 are a tight fit within the channel sections 42 and are held securely in place by the flat headed screws 44 or by rivets or other suitable fastening means. These pads 43 project inwardly of the channel sections 42 towards the vertical axis of the unit to a distance apart from each other which will provide only a slight clearance of the journal 11, thereby limiting the longitudinal movement of the journal lengthwise of the train in a front to rear direction while allowing movement of the journal transversely and vertically. The extension inwardly of the pads 43 beyond the edges of the oval aperture 41 allows for sufficient wear down of the pads without the possibility of the journal coming into contact with the sheet metal plate 40.

The sheet metal plate 40 is faced on its outer or rear side by the sheet rubber seal 45 and on its inner side by the rubber pads 46 and 47. These latter pads 46 and 47 are of a thickness equal to the depth of the channel sections 42 and build up the unit to a uniform thickness. The sheet rubber seal 45 and the rubber pads 46 and 47 extend slightly beyond the side and bottom edges of the sheet metal plate 40 to form a tight seal within the dust guard well when the assembly is pushed down into position. The sheet rubber seal 45 has a central aperture 45a of less diameter than the diameter of the dust guard seat 13 of the journal 11 and will take up the form of the bell mouth seal thereabouts in the manner shown in Figs. 1 and 3.

As one of the objects of the present invention is the elimination of a pliable cementitious material as a means of sealing the interior of the journal box 8 against entry of dust and moisture and the exit of oil at the open top of the dust guard well. To overcome this a cover 48 is fitted over the open top of the dust guard well 8. The cover 48 consists of a thin sheet metal box having top wall 49, side walls 50 and end walls 51. The end walls 51 are extended downwardly to form retaining lugs 52. Cover retaining brackets 53 in the form of bent rods are welded to the outside of the end walls 54 of the dust guard well 8. When the cover 48 is fitted to the top of the dust guard well, the retaining lugs 52 are fitted between the end walls 54 and the brackets 53 and are bent outwards under the brackets as shown in Fig. 2 to hold the cover tightly in place to prevent entry of dust and moisture at the top of the well. The cover 48 also serves to exclude acids which may be allowed to drip onto the journal box from tank cars. This is of particular importance in protecting the rubber of the back seal.

By the use of the above described combined journal stop and back seal in any of the disclosed forms, longitudinal displacement of the journal with respect to the journal bearing is greatly reduced, with considerable less strain on the journal box, due to the fact that the journal stop is located close to the wheel face 55 and not within the journal box proper. The location of the journal stop 15 close to the wheel face 55 has the effect of greatly reducing dynamic load factors with corresponding increased life of the journal, journal bearing, wedge and journal box.

The rubber back seal is preferably made of a rubber composition which will be impervious to oil and grease, and be able to withstand extreme cold and heat, and should have a useful life at least equal to the time between wheel changes. The back seal is positive both in sealing the dust guard well and the dust guard seat of the journal against the entry of dust and moisture to the journal box and against the exit of oil from the journal box. The rearwardly extending bell-shaped rubber seal about the dust guard seat of the journal is both flexible and positive under displacement of the journal with respect to the journal box in any direction of movement of one to the other including angular movement and will adjust itself without damage and loss of seal pressure on movement against the fillet 56 at the wheel face 55. Such flexible and positive back seal is of added importance where pad type lubricators are fitted in the journal boxes. These pad type lubricators, whether encased or not, when squeezed on displacement of the journal relative to the journal box, tend to impart a pumping action to the oil, spraying the oil in all directions within the journal box. The positive seal herein described is proof against the leakage of oil through the back opening in the opening wall of the journal box.

The cover 48 sealing the open top of the dust guard well will provide an economical and clean method of protecting the combined journal stop and back seal from injury and also provides a ready method of inspection of the seal without having to clear away a mass of cemented material as has been necessary in the past.

What I claim is:

1. A combined journal stop and back seal for railroad journal and journal box comprising a rigid metal stop plate, the said metal plate having an oval shaped aperture whose major axis is disposed vertically and its minor axis horizontally and through which a journal may pass, and a resilient sealing member on the face of said metal plate adapted to face inwardly of said journal box when mounted in the journal box and a resilient sealing member on the other face of said metal plate adapted to face outwardly of the journal box when mounted in the journal box, the said latter resilient sealing member having an aperture whose diameter is less than the minor axis of the oval shaped aperture in the said metal stop plate to form a flexible bell-shaped seal about said journal outwardly of said stop plate.

2. A combined journal stop and back seal for railroad journal and journal box including a dust guard well comprising a rigid metal stop plate, the said metal plate having an oval shaped aperture whose major axis is disposed vertically and through which a journal may pass, and a resilient sealing member on the face of said metal plate adapted to face inwardly of said journal box when mounted in the journal box and a resilient sealing member on the other face of said metal plate adapted to face outwardly of the journal box when mounted in the journal box, the said first mentioned resilient sealing member being located around the edge thereof while the said latter resilient member has an aperture centered with the aperture in said metal plate and whose diameter is less than the minor axis of the oval shaped aperture in the metal stop plate to form a flexible bell-shaped seal about said journal outwardly of said stop plate.

3. A combined journal stop and back seal for railroad journal boxes as set forth in claim 2, in which the rigid metal stop plate is of a shape and size to fit into the dust guard well of a car journal box.

4. A combined journal stop and back seal for railroad journal boxes as set forth in claim 2, in which the resilient sealing members are bonded to the faces of the rigid metal stop plate.

5. A combined journal stop and back seal for railroad journal boxes as set forth in claim 3, in which the outer edges of the sealing members extend slightly beyond the outer edges of the rigid metal stop plate to form a peripheral oil seal.

6. A combined journal stop and back seal for railroad journal boxes as set forth in claim 5, in which the outer edges of the sealing members are joined together to enclose the edges of the rigid metal stop plate.

7. A combined journal stop and back seal for railroad journal boxes as set forth in claim 2, in which the metal stop plate is thickened on one face between the edges of the oval aperture at its minor axis and the inner edge of the inner sealing member.

8. A combined journal stop and back seal for railroad journal and journal box comprising a rigid metal plate, said metal plate having an oval shaped aperture whose major axis is disposed vertically and its minor axis horizontally, oppositely disposed stops mounted on one side of said metal plate on the horizontal minor axis of its aperture, the said stop being projected inwardly towards each other to form a stop gap of less distance than the minor axis of the aperture in the metal plate, and resilient sealing means secured to the face of said metal plate adapted to face outwardly of said journal box when mounted in the journal box, the said resilient sealing means having an aperture whose diameter is less than the gap between said stops to form a flexible bell-shaped seal about said journal outwardly of said stop plate.

9. A combined journal stop and back seal for railroad journal and journal box comprising a rigid metal plate, said metal plate having an oval shaped aperture whose major axis is disposed vertically and its minor axis horizontally, horizontally disposed channel surfaces formed on said metal plate centered on the horizontal axis of the oval shaped aperture, oppositely disposed stops mounted in said channels, the said stops being projected inwardly towards each other to form a stop gap of less distance than the minor axis of the aperture in the metal plate, and resilient sealing means secured to the face of said metal plate adapted to face outwardly of said journal box when mounted in the journal box, the said resilient sealing means having an aperture whose diameter is less than the gap between said stops to form a flexible bell-shaped seal about said journal outwardly of said stop plate.

10. A combined journal stop and back seal for railroad journal boxes comprising a rigid metal plate, said metal plate having an oval shaped aperture whose major axis is disposed vertically and its minor axis horizontally, horizontally disposed channel surfaces formed on said metal plate centered on the horizontal axis of the oval shaped aperture of the metal plate, oppositely disposed stops mounted in said channels, the said stops being projected inwardly towards each other to form a stop gap of less distance than the minor axis of the aperture in the metal plate, a resilient sealing member secured to the channeled face of said metal plate, the said sealing member covering the exposed surfaces of said stops and having an aperture whose diameter is less than the gap between said stops to form a flexible bell-shaped journal seal, and resilient sealing members secured to the opposite face of said metal plate above and below the horizontal edges defining said channel surfaces.

11. A combined journal stop and back seal for railroad journal boxes, in combination, a journal, a journal box enclosing the journal, said journal box having a back wall forming a dust guard well, a plate type journal stop within said dust guard well, the said journal stop having an oval aperture through which the said journal passes, the oval aperture in the journal stop having its major axis disposed vertically and its minor axis disposed horizontally, the said journal stop limiting the movement of the said journal in a horizontal direction at right angles to the axis of the journal while allowing a degree of movement transversely and vertically, a resilient sealing member bonded to the face of said metal plate facing outwardly of said journal box, said sealing member having an aperture of less diameter than the said journal and forming a flexible bell-shaped seal thereabout outwardly of said journal stop and a cover closing the open top of said dust guard well, said cover holding said journal stop in position within the dust guard well.

12. A combined journal stop and back seal for railroad journal boxes as set forth in claim 11, in which the journal box is provided with slot type brackets on its outside adjacent the open top of the dust guard well and the cover means is provided with lugs bendable under said slot type brackets.

13. A combined journal stop and back seal for railroad journal boxes, in combination, a journal, a journal box enclosing the journal, said journal box having a back wall forming a dust guard well, a plate type journal stop within said dust guard well, the said journal stop having an aperture through which the said journal passes, the walls of the journal stop aperture limiting the movement of said journal in a horizontal direction at right angles to the axis of the journal while allowing a degree of movement transversely and vertically, and a resilient sealing member forming an envelope about the faces and edges of said journal stop and sealing said journal stop within the said dust guard well, one wall of said envelope having an aperture therein, the peripheral edge of which is of less diameter than said journal and forms a flexible bell-shaped seal about the said journal outwardly of said journal stop.

14. A combined journal stop and back seal for railroad journal boxes, in combination, a journal, a journal box enclosing the journal, said journal box having a back wall forming a dust guard well, a plate type journal stop within said dust guard well, the said journal stop having an oval aperture through which the said journal passes, the oval aperture in the journal stop having its major axis disposed vertically and its minor axis horizontally limiting the movement of the said journal in a horizontal direction at right angles to the axis of the journal while allowing a degree of movement transversely and vertically, and a resilient sealing member enveloping the edges of said journal stop around its side and lower edges, to form with said journal stop a tight seal within said dust guard well, the said sealing member on one side extending over the face of said journal stop and having an aperture located central with the oval aperture of the said journal stop, the aperture in said sealing member having a diameter less than the diameter of said journal to form a tight but resilient bell-shaped seal between said sealing member and said journal outwardly of said journal stop.

References Cited in the file of this patent

UNITED STATES PATENTS

| | | |
|---|---|---|
| 838,707 | Godley | Dec. 18, 1906 |
| 1,836,653 | Ditmore | Dec. 15, 1931 |
| 2,105,871 | Vigne | Jan. 18, 1938 |
| 2,637,604 | Potter | May 5, 1953 |
| 2,663,583 | Bissell et al. | Dec. 22, 1953 |
| 2,768,012 | Klingler | Oct. 23, 1956 |
| 2,833,570 | La Porte et al. | May 6, 1958 |